United States Patent [19]
Stancil

[11] Patent Number: 5,951,685
[45] Date of Patent: Sep. 14, 1999

[54] COMPUTER SYSTEM WITH SYSTEM ROM INCLUDING SERIAL-ACCESS PROM COUPLED TO AN AUTO-CONFIGURING MEMORY CONTROLLER AND METHOD OF SHADOWING BIOS CODE FROM PROM

[75] Inventor: Charles J. Stancil, Tomball, Tex.

[73] Assignee: Compaq Computer Corporation, Houston, Tex.

[21] Appl. No.: 08/771,557

[22] Filed: Dec. 20, 1996

[51] Int. Cl.[6] .................................................. G06F 9/06
[52] U.S. Cl. ..................................................... 713/2
[58] Field of Search .................. 395/651, 652, 395/653, 712, 200.5, 200.51, 200.52; 713/1, 2, 3; 709/220, 221, 222

[56] References Cited

U.S. PATENT DOCUMENTS

| | | | |
|---|---|---|---|
| 4,984,191 | 1/1991 | Vermesse | 705/410 |
| 5,101,490 | 3/1992 | Getson, Jr. et al. | 395/425 |
| 5,214,695 | 5/1993 | Arnold et al. | 380/4 |
| 5,230,052 | 7/1993 | Dayan et al. | 395/652 |
| 5,325,529 | 6/1994 | Brown et al. | 395/200.52 |
| 5,355,498 | 10/1994 | Provino et al. | 395/700 |
| 5,410,680 | 4/1995 | Challa et al. | 395/500 |
| 5,444,861 | 8/1995 | Adamec et al. | 395/652 |
| 5,664,194 | 9/1997 | Paulsen | 395/652 |

OTHER PUBLICATIONS

Microchip, "Microchip Non–Volatile Memory Products Data Book 1995.1996 Edition," May 1995, © 1995 Microchip Technology, Inc., DS21061D pp. 3–125 through 3–144.
intel® Peripheral Components, p. 1–170 (1996).
intel® Flash Memory Databook Documentation Update, pp. iii, 38–39 (1995).
Phillips Semiconductors, "The I[2] C—bus and how to use it".

Primary Examiner—Kevin A. Kriess
Attorney, Agent, or Firm—Akin, Gump, Strauss, Hauer & Feld, L.L.P.

[57] ABSTRACT

A computer system having a processor is provided with a memory controller serially coupled to a serial-access programmable read-only-memory ROM (PROM) through a serial PROM interface of the controller. A random-access memory controller randomly accesses the BIOS code in the serial PROM during power-up of the computer system in response to read requests from the CPU. If the memory controller cannot immediately process the read requests from the CPU, the controller creates wait states for the CPU. An auto-configuring memory controller sequentially accesses the entire BIOS code in the serial PROM during power-up and prior to the running of the CPU and copies it to a portion of base memory, eliminating random accesses to the PROM.

12 Claims, 8 Drawing Sheets

COMPUTER SYSTEM WITH SYSTEM ROM INCLUDING SERIAL-ACCESS PROM COUPLED TO AN AUTO-CONFIGURING MEMORY CONTROLLER AND METHOD OF SHADOWING BIOS CODE FROM PROM

CROSS-REFERENCE TO RELATED APPLICATIONS

The following disclosure is hereby incorporated by reference:

U.S. application Ser. No. 08/606,546, filed on Feb. 26, 1996, entitled "EASILY PROGRAMMABLE MEMORY CONTROLLER WHICH CAN ACCESS DIFFERENT SPEED MEMORY DEVICES ON DIFFERENT CYCLES," by Jeffrey C. Stevens, John E. Larson, Gary W. Thome, Michael J. Collins, and Michael Moriarty.

STATEMENT REGARDING FEDERALLY SPONSORED RESEARCH OR DEVELOPMENT

Not applicable.

BACKGROUND OF THE INVENTION

1. Field of the Invention

The present invention relates to computer systems with a system ROM including a serial-access PROM coupled to an auto-configuring memory controller for shadowing BIOS code from the serial-access PROM.

2. Description of the Related Art

Today's modern personal computer system is typically initialized, or boot-strapped, during a power-up sequence using system software also known as firmware and information representing a sequence of internal control variables stored within a system read-only-memory (ROM). Since the system ROM is non-volatile, the content of the ROM contains valid data or instructions so that the computer system can be reliably boot-strapped to a point where the disk operating system (DOS) can be loaded to complete the boot-up sequence.

In an IBM PC or an IBM compatible PC system, the system ROM stores the basic input/output system (BIOS) which is executed upon power-up by the microprocessor to initialize the system, to perform a power-on-self-test (POST), and to provide certain low level, hardware dependent support for the display, floppy/hard disk drives, and communication devices. BIOS code provides the lowest level of interface between the operating system and the hardware. In the original PC architecture, the BIOS code was fairly straightforward and required little memory space. However, more sophisticated routines and data have more recently been included in the system ROM, based upon the needs and complexity of a given computer system.

In addition to the microprocessor which may be used as a central processing unit (CPU), other processing devices are also present in a modern computer. These processing devices can be a coprocessor for performing specialized processing, a digital signal processor for handling modem, video and signal processing requirements, and one or more microcontrollers which handle the peripheral devices and offload the processing from the microprocessor. These processing devices may also require one or more ROMs to store their operating code. Typically, a microcontroller has a small amount of on-chip ROM and RAM to enable the microcontroller to operate with a minimum part count. However, certain applications require more storage space than available with the built-in ROM on the microcontroller. In these instances, the microcontroller may require an external ROM device to handle more sophisticated applications of software.

A large capacity, reprogrammable storage device called a flash ROM is typically used to store the POST and BIOS routines required for the initialization and operation of the computer system. While most memory technologies have densities that are increasing, flash memory technology has enabled flash ROM to achieve even higher densities providing large memory capacity in smaller packages. These higher densities in smaller packages have led to increases in the minimum memory capacity of flash ROM that is available on the market. Cost of flash ROM has, however, remained relatively high based on memory capacity rather than package size.

Presently, there are ongoing initiatives to dramatically reduce BIOS code in size by decreasing the run-time support that has traditionally been present in BIOS. While a conventional BIOS image typically exceeds 128 KB, an advanced BIOS image lacking run-time support services would be well serviced with 32 KB. The use of relatively expensive flash ROM with its increased densities as system ROM thus is no longer desirable or cost-efficient. While today's flash ROMs have a minimum size of 128 KB, BIOS without run-time services requires substantially less memory capacity. The size of the BIOS image is further reduced given the prevalence of microcontrollers which have their own ROM-BIOS, such as graphic controllers and drive controllers.

Typically, flash ROM containing BIOS information may be connected to a MSIO (mobile super I/O) chip housed on an external bus or is directly linked to an external bus. While system ROM was originally housed like RAM directly off the memory controller of the computer system, it became necessary to migrate system ROM away from the 128 KB BIOS space to the external bus, allowing for extended and expanded ROM. Recently, peripheral and other units located off of the external bus are being integrated onto a primary bus such as the Peripheral Component Interconnect (PCI) bus. This has been done to eliminate an external bus and thereby optimize space within a computer system. Thus, given the reduction in the size of the BIOS image and migration of external bus units to the PCI bus, location of ROM-BIOS on the external bus is undesirable.

Moreover, flash ROM for BIOS is typically parallel-access in order to optimize the speed in communicating with flash ROM. However, ROM access times for BIOS are already largely irrelevant because of shadowing. Shadowing is the process of the CPU copying contents of selected portions of ROM-BIOS into predetermined temporary memory locations in dynamic random access memory (DRAM). The portions of the DRAM which receive the selected portion of the BIOS are sometimes referred to as the shadow RAM. Once the selected portions of ROM-BIOS are transferred, these portions of ROM-BIOS are disabled, and the corresponding portions of shadow RAM are enabled. Once shadowed, accesses to BIOS routines are accelerated because the RAM access time is much faster than the ROM access time. Furthermore, the decrease in run-time support services as a BIOS segment further reduces a concern for BIOS access times. In particular, when run-time support services are eliminated, firmware is used only to boot-strap the operating system, with the firmware no longer being needed after the operating system is loaded. Thus, given the reduced concern for BIOS access times, parallel-access ROM is an unnecessary system cost.

During boot-up, the CPU sends a read request for BIOS code at a predetermined location to the memory controller.

The memory controller then addresses the parallel-access flash ROM to the mapped location corresponding to the CPU address given by the CPU and requests the code at the flash ROM address. In response to the read request by the memory controller, the flash ROM returns the line of code at the mapped location to the memory controller, and the memory controller then returns the code to the CPU. This process continues until the system is initialized or an interrupt signal is received. Given the addressing and mapping entailed in communicating with the flash ROM, flash ROM is thus accessed randomly by the memory controller during boot-up. However, random accesses to ROM are generally not favored, due to the lack of rapid implementation.

BRIEF SUMMARY OF THE INVENTION

In accordance with the present invention, a computer system having a processor is provided with a serial-access PROM for storing BIOS code, a memory controller serially connected to the PROM for retrieving BIOS code from the PROM, and a PROM serial interface of the memory controller for allowing communication between the serial-access PROM and the memory controller.

In the present invention, BIOS code may be retrieved from the serial PROM either during the boot-up process using a random-access memory controller or prior to the boot-up process using an auto-configuring memory controller. During the boot-up process, the random-access memory controller randomly accesses BIOS code in the serial PROM responsive to CPU read requests. If the memory controller cannot immediately process the CPU's read request, the controller creates wait states for the CPU. Alternatively, prior to boot-up, the auto-configuring memory controller auto-detects the base memory and auto-configures itself to sequentially load the entire contents of the serial PROM into a portion of base memory. Thus, the entire serial PROM is read in one read operation eliminating random accesses to the PROM.

BRIEF DESCRIPTION OF THE DRAWINGS

The present invention may be more readily described and understood by reference to the accompanying drawings in which.

DETAILED DESCRIPTION OF THE PREFERRED EMBODIMENT

Figure 1:
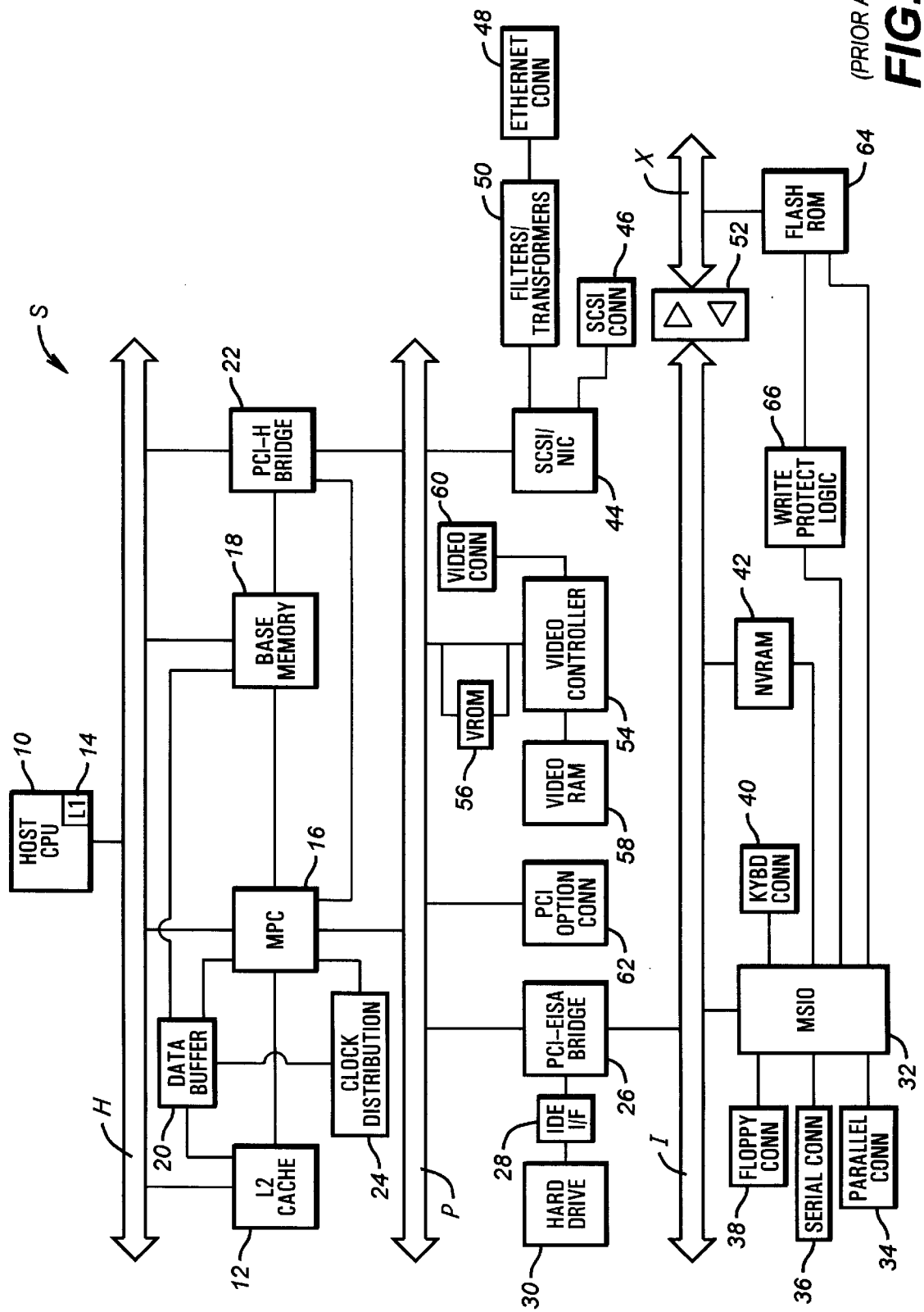
FIG. 1 is a schematic diagram of a prior art computer system having a parallel-access flash ROM.

Turning now to the drawings, FIG. 1 shows a computer system S according to the prior art. An understanding of the prior art computer system S is helpful in fully appreciating the nature of the computer system C of the present invention. Within the prior art computer system S, a CPU 10 and a level two (L2) cache 12 are connected to a high speed host bus H. The processor 10 preferably operates with a standard IBM-PC compatible operating system, such as MS-DOS or Windows. The L2 cache 12 provides additional caching capabilities to the processor's on-chip cache 14 (L1) to improve performance.

In addition to the CPU 10 and caches 12 and 14, a number of memory interface and memory devices are connected between the host bus H and a PCI bus P. These devices include a memory controller 16 such as the memory to PCI cache controller (MPC), a base memory array 18 such as a dynamic random access memory (DRAM) array, and a data buffer 20. The memory controller 16 is connected to the host bus H, the PCI-host bridge 22, and the PCI bus P. The memory controller 16 is further connected to clock distribution and generation circuitry 24. The clock circuitry 24, which is connected between the memory controller 16 and the PCI bus P, provides operating timing signals or clocks to the computer system S.

The base memory 18 is connected to the host bus H and also connected to the PCI bus P through a PCI-host bridge 22. The data buffer 20 is connected to the PCI bus P and also connected to the host bus H through the L2 cache 12. The memory controller 16, base memory 18, and data buffer 20 collectively form a high performance memory system for the computer system S. While preferably the memory controller 16 is a memory to PCI cache controller (MPC), other memory controllers are known and also may be used.

The PCI-host bridge 22, which is connected to the PCI bus P and the host bus H, is provided to convert signals between the two buses. This bridge 22 includes the necessary address and data buffers, latches, and arbitration and bus master control logic for communication between the host bus H and the PCI bus P.

The input/output bus in the computer system S is preferably the Industrial Standard Architecture (ISA) bus I which is connected to the PCI bus P through a PCI to ISA bridge 26. However, one skilled in the art would realize that other input/output buses may also be used. The PCI to ISA bridge 26 provides various support functions for the computer system S. Preferably the PCI-ISA bridge 26 is a single integrated circuit that acts as a PCI bus master and slave, an ISA bus controller, an ISA write posting buffer, an ISA bus arbiter, DMA devices, and an IDE disk interface. The bridge 26 is also connected to an IDE interface port 28 for driving one or more peripherals such as a hard disk drive 30. Peripheral devices to store boot data such as a disk drive 30 are used in the initial power-up of the computer system S.

The PCI-EISA bridge 26 is connected to the ISA bus I which is connected to an MSIO (mobile super I/O) chip 32. The MSIO 32 provides a parallel port 34, a serial port 36, a floppy interface 38, a keyboard interface 40, and a non-volatile random access memory 42 (NVRAM). In addition, a Small Computer Systems Interface (SCSI) and network interface controller (NIC) 44 are connected to the PCI bus P. Preferably the SCSI/NIC 44 is a single integrated circuit and includes the capabilities necessary to act as a PCI bus master or slave and circuitry to act as a SCSI controller and local area network or Ethernet interface. A SCSI connector 46 is connected to the controller 44 to allow connection of various SCSI devices, such as hard disk drives and CD-ROM drives. An Ethernet connector 48 is provided also and is connected to filter and transformer circuitry 50 which in turn is connected to the controller 44. This forms a network or Ethernet connection for connecting the computers to a local area network (LAN). Also, an external bus X is connected to the ISA bus I through a buffer 52.

The computer system S is shown with exemplary video devices. A video graphics controller 54 and video ROM 56 is connected to the PCI bus P. The video graphics controller 54 controls the operation of the video ROM 56, allowing graphics data to be written, stored, and retrieved as required. The video data may also be temporarily stored in the video RAM 58 which is connected to the video graphics controller 54. The video graphics controller 54 is further connected to a video connector 60 which may be connected to a video device such as a monitor (not shown). In addition, a PCI option connector 62 is preferably connected to the PCI bus P. As well, the system S may have a plurality of PCI and ISA type peripherals on their respective buses.

Each of the devices of the computer system S noted thus far are also preferably included in the computer system C of the present invention. Further, while the architecture of the computer system C is preferably a PCI architecture, other computer architectures known in the art are contemplated.

The prior art computer system S utilizes a conventional approach for storing BIOS code. In the computer system S, flash ROM 64 holds the BIOS code. The parallel-access flash ROM 64 is typically located off of the external bus X and is connected to the MSIO chip 32. The flash ROM 64 receives its control, address, and data signals from the chip 32. Thus, in order to load BIOS code from the flash ROM 64, the CPU 10 either communicates with the MSIO chip 32 or instructs the memory controller 16 to do so. The flash ROM 64 is further connected to write-protect logic 66 which is also connected to the MSIO chip 32. The location of the flash ROM 64 off of the external bus X allows for extended and expanded ROM, thereby accommodating a BIOS image space exceeding 128 kilobytes (KB). Thus, in the prior art computer system S, an external bus X and a parallel-access programmable read-only-memory (PROM) 64 are utilized to store BIOS code.

The undesirable features of such a prior art approach have been discussed above. Briefly, they include the location of a PROM off of the external bus and the use of relatively expensive parallel-access PROMs. These features impose unnecessary space constraints and system costs on computers.

Figure 2:
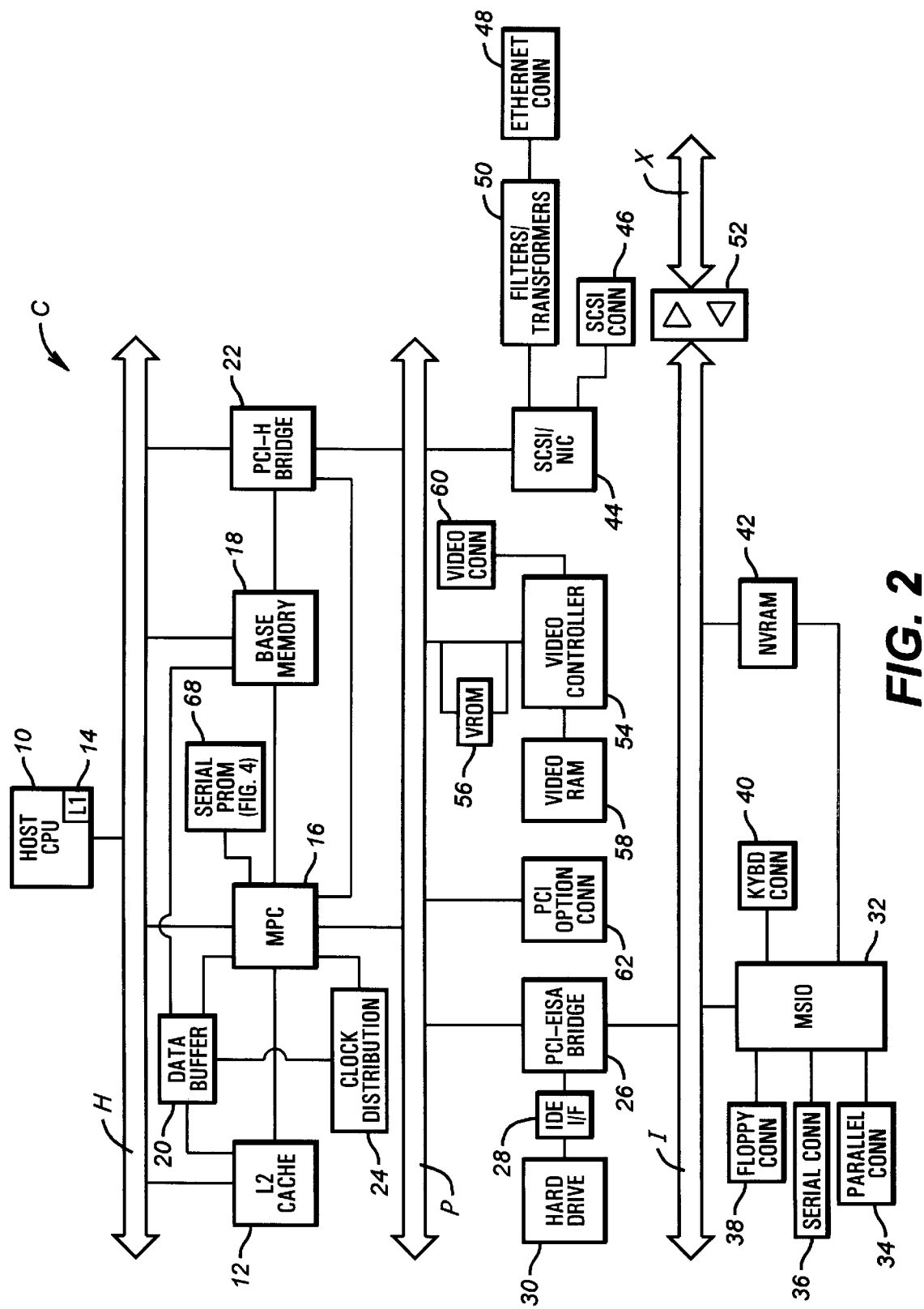
FIG. 2 is a schematic diagram of a computer system having a serial-access PROM in accordance with the present invention.

Referring to FIG. 2, the computer system C of the present invention does not require a parallel-access PROM or a PROM housed on the external bus X. Instead, in the present invention, a serial-access PROM 68 is directly coupled to the memory controller 16. As will be set forth below, the present invention provides many advantages. By directly coupling a PROM 68 to the memory controller 16, the present invention conserves space within a computer system. Also, by using serial-access PROMs, system costs are reduced. Further, the present invention eliminates random accesses to system ROM containing BIOS code.

There are two disclosed embodiments of the memory controller of the present invention. The first utilizes a random-access memory controller 70 (FIG. 3) which addresses and reads the BIOS code from the serial-access PROM 68 (FIGS. 2 and 4). The other embodiment uses an auto-configuring memory controller 72 (FIG. 6) which sequentially reads the BIOS code from the serial-access PROM 68. Both memory controllers 70 and 72 are preferably an MPC 16. In addition to the description of the MPC set forth below, the incorporated co-pending U.S. Application entitled "EASILY PROGRAMMABLE MEMORY CONTROLLER WHICH CAN ACCESS DIFFERENT SPEED MEMORY DEVICES ON DIFFERENT CYCLES" provides additional details on the MPC.

Figure 3:
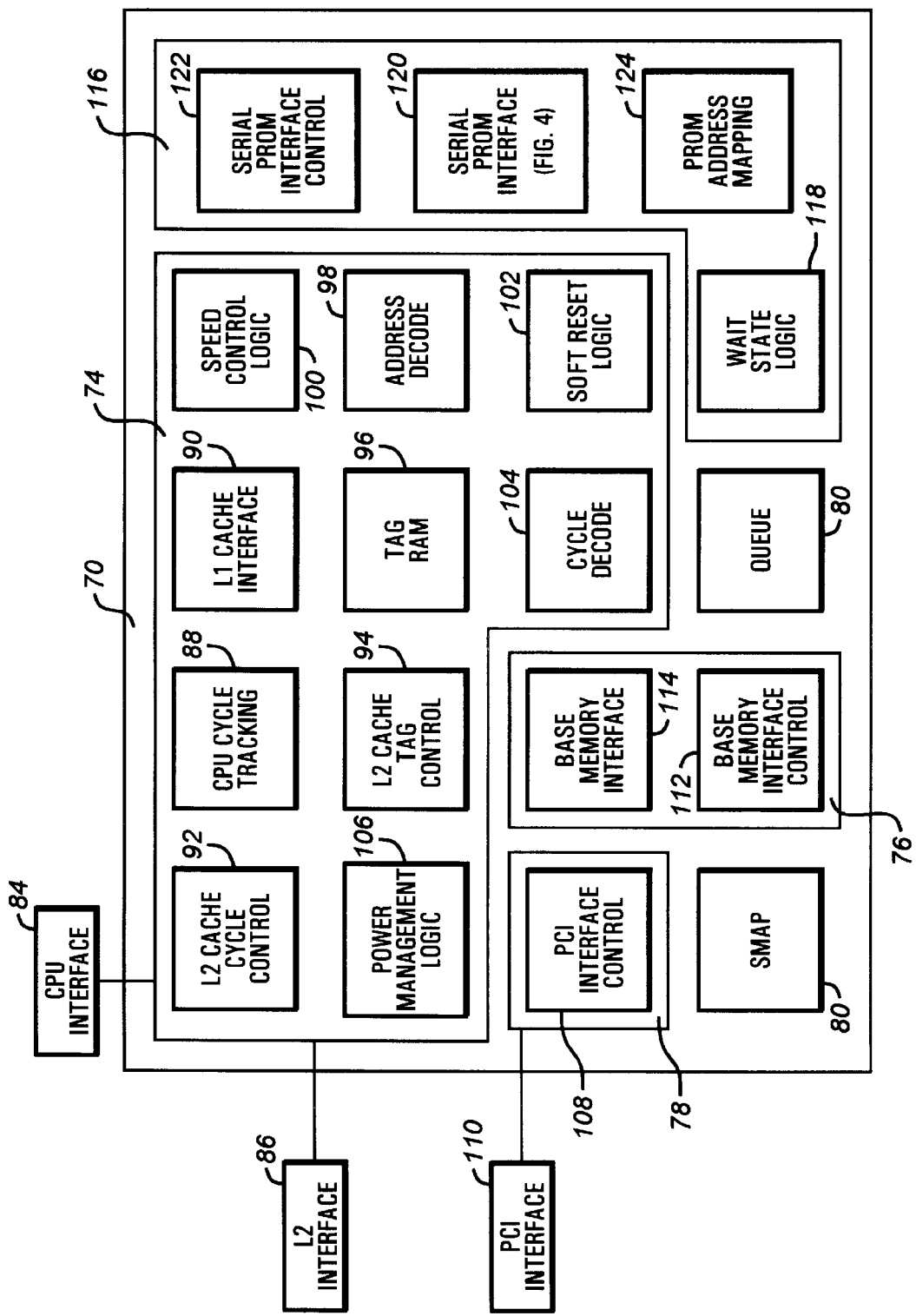
FIG. 3 is a schematic diagram of a random-access memory controller of the computer system of FIG. 2.
Figure 4:
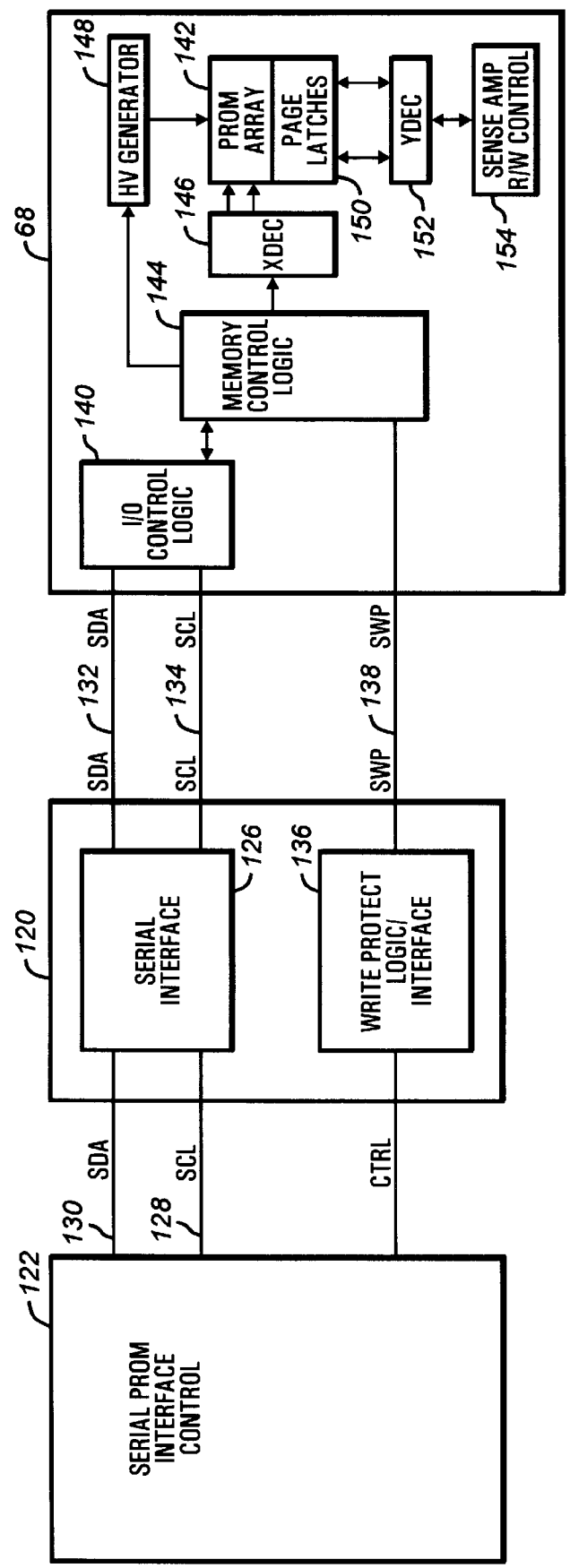
FIG. 4 is a schematic diagram of a serial-access PROM in connection with a memory controller of the computer system of FIG. 2.

Referring to FIG. 3, the MPC 16 has three major functional interfaces: a processor/L2 cache control (PCON) 74, a memory control (MCON) 76, and a PCI control (ICON) 78. Each of these control blocks operates independently of the others. A queue unit 80 which stores address and status information allows for communication between the control blocks. Another unit independent of these control blocks is the system memory (SMAP) unit 82. The SMAP unit 82 controls the various decode and timing parameters for the processor 74, PCI interface 78, and memory control blocks 76.

PCON 74 controls the CPU interface 84 and the second level cache interface 86. The PCON submodules typically include CPU cycle tracking 88, L1 cache interface 90, L2 cache cycle control 92, L2 cache TAG Control 94, TAG RAM 96, Address Decode logic 98, Speed Control logic 100, Soft Reset logic 102, Cycle Decode logic 104, and Power Management logic 106. The CPU cycle tracking module 88 tracks the various cycles that the processor 10 can run, such as memory reads and memory writes. The L1 cache interface module 90 handles snoop control of the L1 cache 14. The L2 cache cycle control logic module 92 controls the cycles to the secondary cache, such as read hits, allocates, and L2 writebacks. The L2 cache TAG Control module 94 controls accesses to the TAG RAM 96 from both CPU and snoop accesses. The TAG RAM module holds the size, speed, and associativity parameters of the L2 cache 12. The Address Decode module 98 generates address select signal outputs. The Speed Control module 100 controls the slowdown of the CPU 10. The Soft Reset module 102 generates a soft reset pulse to the processor 10. The Cycle Decode module 104 decodes various memory and processor cycles. Lastly, the Power Management Logic module 106 controls the different states of power consumption of the computer system C.

The ICON interface 78 typically includes the PCI Interface Control Block 108. The PCI Interface Control Block 108 controls the PCI interface 110. When the CPU 10 accesses the PCI bus P, ICON 78 operates as a PCI master. When a PCI master accesses memory, ICON 78 acts as a PCI slave. Similarly, the primary component of MCON interface 76 is the Base Memory Interface Control Block 112. The Base Memory Interface Control Block 112 controls a base memory interface 114 such as the DRAM interface. The DRAM interface 114 serves as the interface for a base memory array 18 such as the DRAM array. MCON 76 also generates control signals to the data buffer 20.

The additional control unit of the present invention memory controller not provided in a conventional memory controller is the serial PROM control unit (SPCON) 116. For the random-access memory controller 70, SPCON 116 includes a wait state logic module 118, a serial PROM interface module 120, a serial PROM interface control module 122, and a PROM address mapping module 124. These control modules allow the memory controller 70 to address and read BIOS code from a serial-access PROM 68. While the random-access function and the auto-configuring function of the memory controller 16 are described in two distinct memory controllers, it may be desirable to integrate the two functions into a dual-mode memory controller to save on system overhead costs.

Turning to FIG. 4, the serial PROM interface 120 in PROM control unit 116 of FIG. 3 preferably receives three signals from the serial PROM interface control logic 122: a serial data signal SDA, a serial clock signal SCL, and a control signal CTRL for controlling the write-protect function of the serial PROM. The serial PROM interface 120 also preferably uses a serial protocol such that the data and clock signals are received by the serial interface submodule 126 of the serial PROM interface 120. The clock signal SCL has a bidirectional clock line 128 which serves to synchronize data transfer from and to the serial PROM 68 on a bidirectional serial data line 130. A data line 132 and a clock line 134 are directed to the serial PROM 68 from the serial interface submodule 126 of the serial PROM interface 120.

The serial protocol is preferably the inter-integrated ($I^2C$) protocol; however, other serial protocols such as Serial Peripheral Interface (SPI) are also contemplated. Under the $I^2C$ protocol, the serial PROM interface control logic 122 of the memory controller 16 functions as a master, and the serial PROM 68 functions as a slave. As the master, the memory controller 16 initiates data transfers, generates the clock signal SCL, and terminates data transfers. As the slave, the serial PROM 68 is addressed by the memory controller 16. Other details on $I^2C$ protocol can be found in "The $I^2C$-Bus and How to Use It (Including Specification)," published by Phillips Semiconductors, January 1992. Further, the serial PROM interface control logic 122 also uses a control signal CTRL to control the write-protect logic/interface submodule 136 of the serial PROM interface 120. The write-protect logic 136 controls a serial write-protect signal SWP on a serial data line 138 to the serial PROM 68. The write-protect function of the serial PROM 68 provides data protection and guarantees BIOS recovery. Unless the PROM 68 is being updated, the serial PROM 68 is preferably write-protected, inhibiting all write operations to the serial PROM 68.

The serial data line 122 and the serial clock line 134 from the serial interface submodule 126 of the serial PROM interface 120 are routed to the I/O control logic module 140 of a conventional serial PROM 68. The serial PROM 68 is preferably an electrically erasable PROM (EEPROM) to allow for electrical erasure of the memory array 142. The direction of data flow, the PROM modules and the connections shown in the block diagram of the conventional serial PROM 68 in FIG. 4 are exemplary as these characteristics vary with the type of serial PROM 68. A memory control logic module 144 which is coupled to the I/O control logic module 140 is also coupled to an X decoder 146. The I/O control module 140 and the memory control module 144 coordinate data flow to and from the PROM array 142. The memory control logic module 144 is further coupled to a high voltage generator 148. The high voltage generator 148 forms a high energy voltage pulse which allows for electrical erasure of the PROM array 142. Both the X decoder 146 and the HV generator 148 are coupled to the PROM array 142 where the BIOS code is stored. The PROM array 142 is associated with page latches 150 which latch data from and to a Y decoder 152. Collectively, the X decoder 146 and Y decoder 152 decode data addresses for the PROM array 142. Further, the Y decoder 152 is coupled to a sense amp read/write control module 154 which controls the sense amps that detect the logic highs and lows of each cell in the PROM array 142.

Figure 5A:
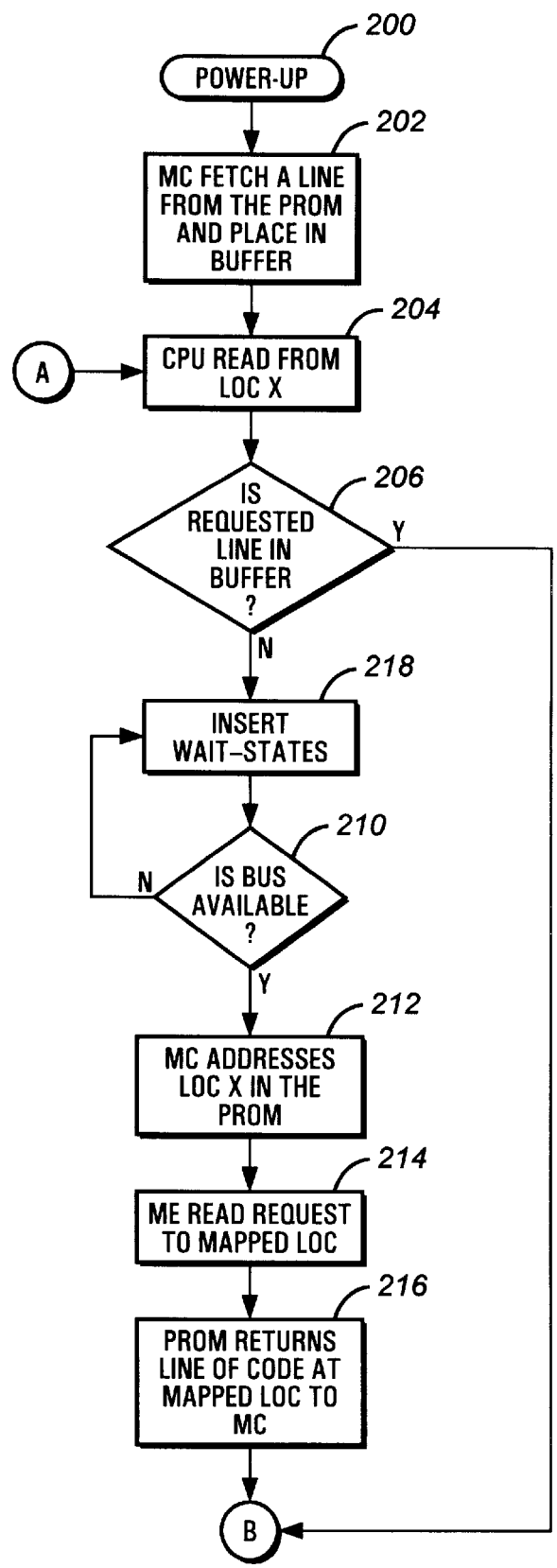
FIGS. 5A and 5B are flow charts of the hard-wired, coded process for shadowing BIOS code from a serial-access PROM which is executed by the random-access memory controller of FIG. 3.

Referring now to FIG. 5A, a flow chart of the hard-wired, coded process of loading BIOS code from a serial-access PROM 68 which is executed by the random-access memory controller (MC) 70 is shown. The instructions are preferably coded in an Application Specific Integrated Chip (ASIC) code. These hard-wired, code commands program the memory controller 16 with the steps necessary to address and load the contents of the serial PROM 68 during boot-up. The technique for programming memory controllers is known in the art and is discussed in the previously incorporated U. S. Application entitled "EASILY PROGRAMMABLE MEMORY CONTROLLER WHICH CAN ACCESS DIFFERENT SPEED MEMORY DEVICES ON DIFFERENT CYCLES."

After power-up at step 200, control proceeds to step 202 where the random-access memory controller 70 of the present invention fetches a line of code from the PROM 68 and places that code in the data buffer 20 prior to a read request by the CPU 10. Although preferably this buffering operation occurs in the main buffer 20 which is coupled between the memory controller 16 and the base memory 18, a buffer for this operation may also be implemented within the memory controller 16 or within the serial PROM 68. This pre-fetch operation prior to a CPU read request allows for burstable CPU accesses to the memory controller 70. Next, at step 204 the processor 10 read requests code from a predetermined processor address. The memory controller 70 responds to the CPU read request at step 204 by determining whether the requested code is in the data buffer 20 at step 206.

If the requested code is in the data buffer 20, the memory controller 70 sends the line of code to the processor 10 at step 208. The processor 10 is understood to execute burst reads, which may or may not be of the size of the fetched line. The memory controller appropriately returns the data to the processor 10 in whatever size data elements are suitable, possibly in more than one burst read operation. If the requested code is not in the buffer 20, processor bus wait-states are inserted for a suitable duration. After the insertion of wait states in step 218, control passes to step 210 and the memory controller 70 then determines whether a suitable bus (e.g., an $I^2C$ bus) is available to access the serial PROM 68. If a suitable bus is available, the memory controller 70 addresses the serial PROM 68 at step 212. This is accomplished by the PROM address mapping module 124 of the present invention which permits the memory controller 70 to access any PROM location in a random manner. The serial PROM address addressed by the memory controller 70 corresponds to the processor address asserted by the CPU 10.

After addressing the serial PROM 68 by sending the mapped address to it over the serial data line 132, the memory controller 70 generates a read request to the code at the mapped location in the serial PROM 68 in step 214. The memory controller's read request signal serves as a start signal for the serial PROM 68. In response to the start signal, control passes to step 216. At step 216, the line of code at the mapped location of the serial PROM 68 is sent to the memory controller 70 over the serial data line 132 by the firmware in the serial PROM 68. Once the flow of the requested data is complete, the memory controller 70 generates and sends a stop signal to the serial PROM 68.

At step 210, if a suitable bus is not available when the CPU read request is made, control returns to step 218 wherein the memory controller 70 processor bus wait states into the CPU cycles. This is accomplished by the wait state logic module 118 of the present invention. The memory controller 70 continues to assert wait states into the processor cycles until a suitable bus becomes available.

Figure 5B:
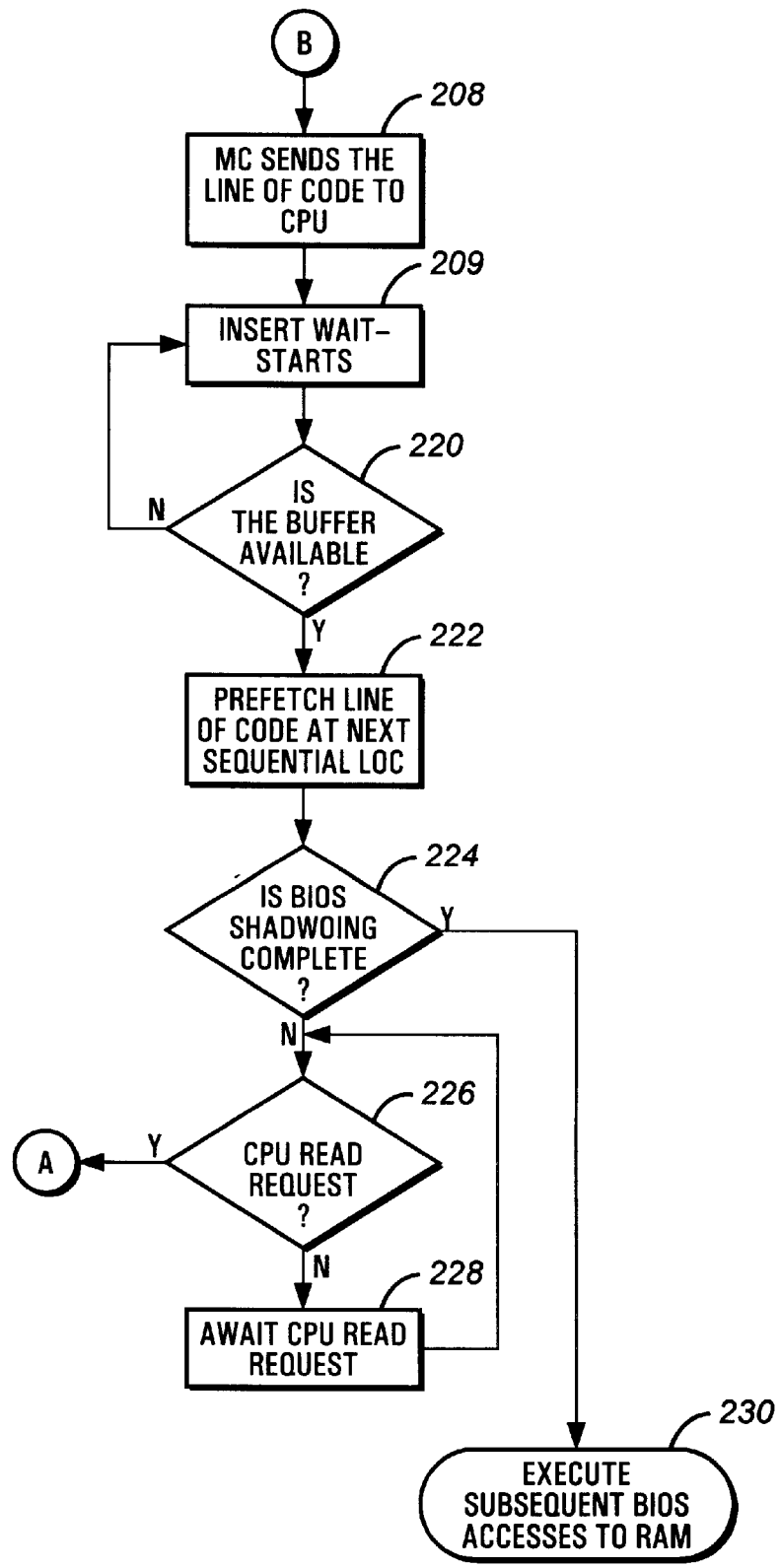

Referring to FIG. 5B, after the memory controller 70 sends a line of code to the processor 10 in step 208, control passes to step 220 where the memory controller 70 again determines whether the data buffer 20 is available. If the buffer 20 is available, the memory controller 70 in step 222 fetches a line of code at the next sequential location in the serial PROM 68 prior to a CPU read request.

After the pre-fetch operation is complete or if the buffer 20 is not available, control proceeds to step 224 where it is determined whether BIOS shadowing is complete. That is, the memory controller 70 continues reading of the PROM 68 until BIOS informs the memory controller 70 that shadowing is complete. If BIOS shadowing is not complete, control passes to step 226 and the memory controller 70 determines if there is another CPU read request. If there is a receipt of another processor read request, control returns to step 204 restarting the serial PROM read cycle. If there is not a read request, control proceeds to step 228 and the memory controller 70 awaits a CPU read request. If BIOS shadowing is complete, control passes to step 230 wherein subsequent BIOS accesses to RAM 18 are executed.

Figure 6:
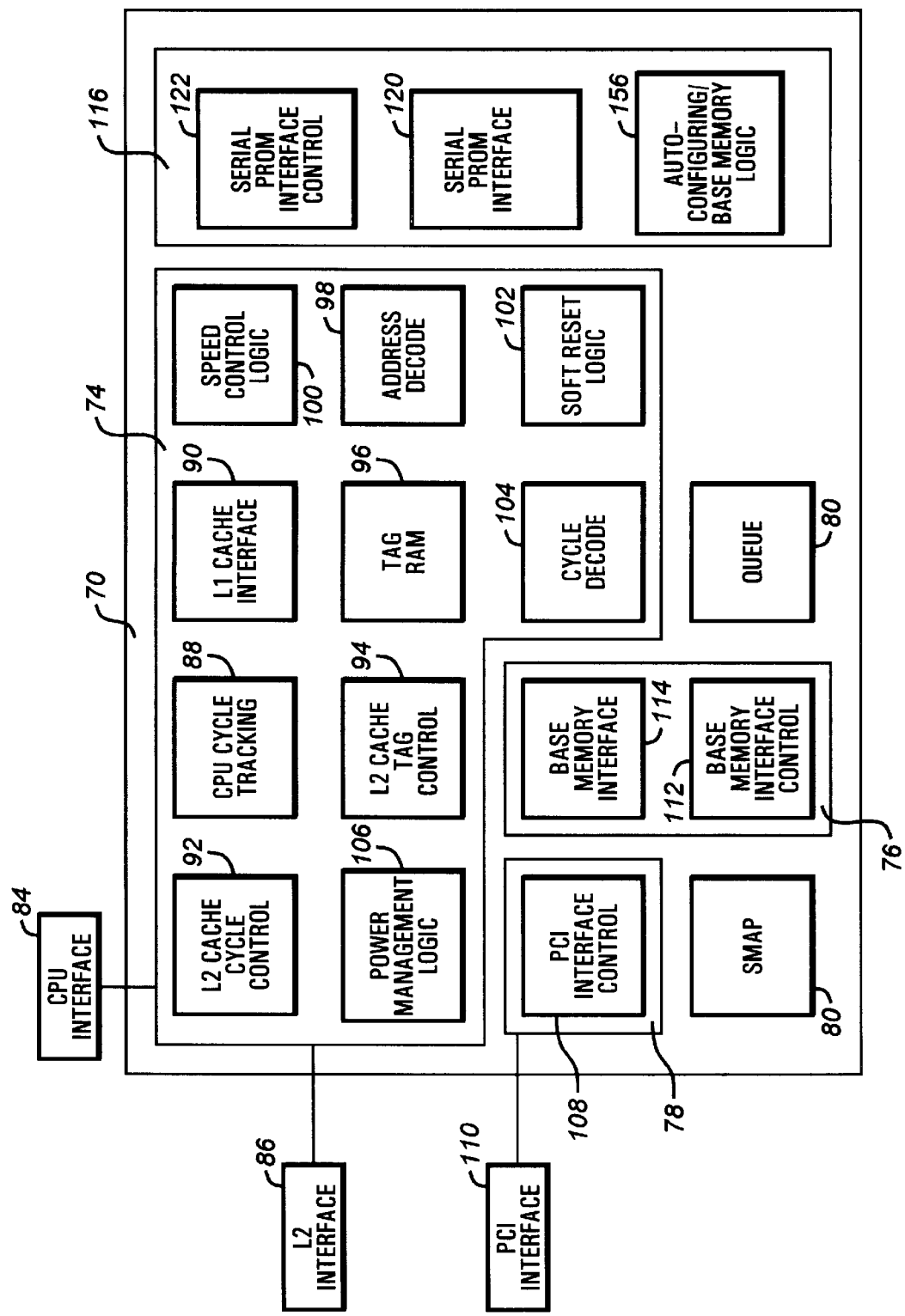
FIG. 6 is a schematic diagram of an auto-configuring memory controller of the computer system of FIG. 2.

In the alternative embodiment using auto-configuring memory controller 72 as shown in FIG. 6, the SPCON 116 of the present invention auto-configuring memory controller 72 includes a serial PROM interface control module 122, a serial PROM interface module 120, and an auto-configuring/base memory logic module 156. The serial PROM interface 120 and the serial PROM interface control 122 modules of the auto-configuring memory controller 72 of FIG. 6 function in a like manner to the structure described above with reference to FIG. 3. The remainder of the auto-configuring memory controller works in a like manner to the random-access memory controller 70 which is set forth in detail above.

Figure 7:
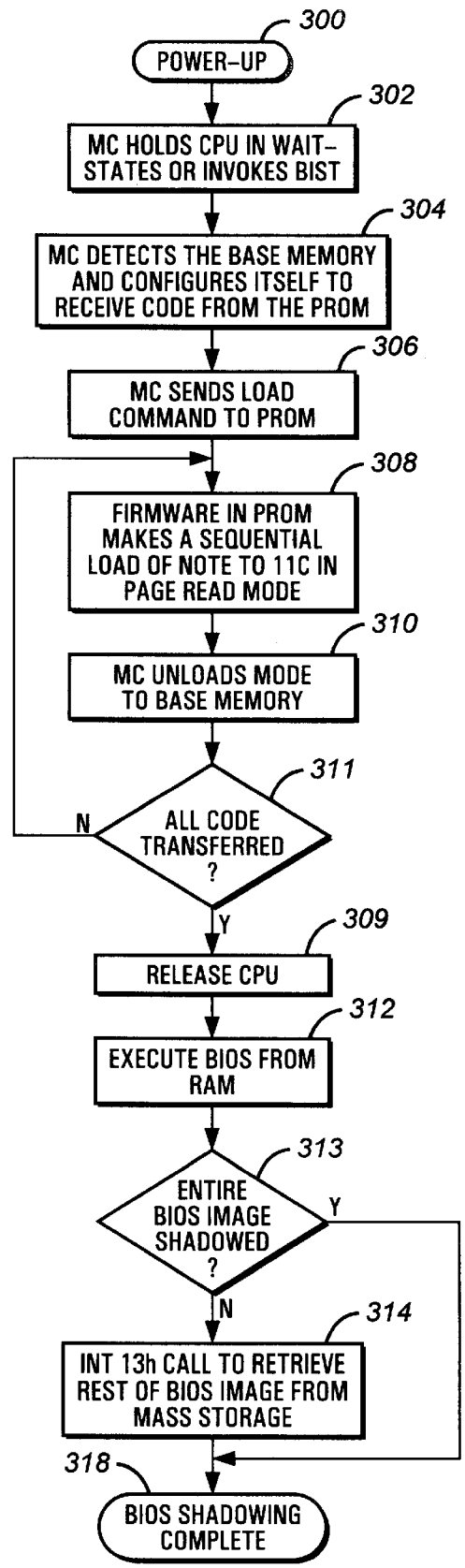
FIG. 7 is a flow chart of the hard-wired, coded process for shadowing BIOS code from a serial-access PROM which is executed by the auto-configuring memory controller of FIG. 6.

Turning to FIG. 7, a flow chart of the hard-wired coded process of sequentially loading BIOS code from a serial-access PROM 68 which is executed by the auto-configuring memory controller (MC) 72 is shown. On power-up at step 300, control passes to step 302 where the memory controller 72 halts the processor 10 by either inserting processor bus wait-states or invoking the CPU's Built-In-Self Test (BIST) function. Next, control proceeds to step 304 where the memory controller 72 detects the base memory 18 and configures itself to receive BIOS code from the serial PROM 68. Then, control passes to step 306 where the memory controller 72 then sends a load command to the serial PROM 68. In response to the load command in step 306, firmware in the serial PROM 68 at step 308 sequentially loads a line of code from the serial PROM 68 to the memory controller 72 over the serial data line 132. The firmware stored in the serial PROM 68 preferably performs this loading operation with the serial PROM 68 in a page-read mode to improve read performance.

Next, control proceeds to step 310 where the memory controller 72 unloads the line of code to a portion of base memory 18 necessary to store the BIOS code. Control then proceeds to step 311 where it is determined whether all of the BIOS code in the serial PROM 68 has been transferred. If all the BIOS code in the serial PROM 68 has not been transferred, control loops and returns to step 308. Thus, the steps of loading from the PROM 68 and to base memory 18 are repeated a line of code at a time until all the BIOS code in the PROM 68 is transferred. The entire contents of the serial PROM 68 are now copied in a portion of base memory 18.

Once all the BIOS code in the serial PROM 68 is transferred, the BIOS image in the PROM 68 has been shadowed and control proceeds to step 309. In step 309, the CPU 10 is released ending the processor bus wait-states, control then passes to step 312. At step 312, the CPU 10 then executes the BIOS from RAM 18 until it reaches the point where it needs to determine whether the entire BIOS image is shadowed. At such point, control passes to step 313 were this determination is made. If the entire image is shadowed, control passes to step 318. If the entire BIOS image is not shadowed, control proceeds to step 314. At step 314, the memory controller 72 of the present invention retrieves the rest of the BIOS image from the mass storage device 30 storing a portion of the BIOS code. This retrieval operation is preferably performed using an INT 13H call. The INT 13H invokes a BIOS disk service routine to perform the retrieval operation. For this operation, the CPU 10 is executing code out of the partially shadowed BIOS.

Thus, it can be seen that the present invention offers distinct operating advantages. Connecting the serial PROM 68 directly to the memory controller 16 eliminates system ROM as an external bus unit, thereby conserving space within the computer system C. The present invention also has the advantage of replacing parallel-access flash ROM 64 having a high pin count with a cheaper serial-access PROM 68 of a much lower pin count. The cheaper serial-access PROM 68 also has memory capacity that matches the needs of an advanced BIOS image.

In the present invention, BIOS code may be retrieved from the serial PROM 68 either during or prior to the boot-up process. During the boot-up process, the CPU 10 sends a request signal to the random-access memory controller 70 for BIOS code at a certain location having a CPU address. The memory controller 70 processes that request by mapping the CPU address to a PROM address using its PROM address mapping logic 124 and read requesting the code at the PROM address. The firmware in the PROM 68 returns the line of code to the memory controller 70, and the memory controller 70 then returns the code to the CPU 10. If the memory controller 70 cannot immediately process the CPU's read request, the memory controller 70 creates wait states for the CPU 10. So that CPU accesses to the memory controller 70 are burstable, the memory controller 70 pre-fetches and buffers a minimum of one cache line upon power-up and following each CPU access to the memory controller 70. Numerous CPU requests are processed by the memory controller 70 during boot-up which concludes once the computer system C is initialized.

Alternatively, upon power-up but prior to boot-up by the CPU 10, the auto-configuring memory controller 72 owning the PROM 68 can auto-detect the base memory 18 and auto-configure itself so that it can copy the entire contents of the PROM 68 into a portion of base memory 18 necessary to store the BIOS code. In this situation, the memory controller 72 includes auto-configuring base memory logic 156 instead of wait state logic 118 and PROM address mapping logic 124 as provided in the random-access memory controller 70. After the PROM 68 receives a load command from the memory controller 72, the PROM 68 in its page-read mode serially and sequentially loads its contents into a portion of base memory 18. The steps of loading BIOS code from the PROM 68 and to base memory 18 are repeated a line of code at a time until all the BIOS code in the PROM 68 is transferred.

After the loading of BIOS code from the PROM 68 is complete, the memory controller 72 determines whether the entire BIOS image is in the PROM 68. If the BIOS image is larger than the capacity of the PROM 68 such that part of the BIOS image is stored in a mass storage device 30 of the computer system C, the memory controller 72 retrieves that portion of the BIOS code from the mass storage device 30.

The memory controller 72 then copies the code into a portion of base memory 18. Once the entire BIOS image is in base memory 18, the firmware proceeds to load the operating system. During the boot-up process when the CPU 10 makes a read request, the memory controller 72 accesses base memory 18 rather than the slower PROM 68. Thus, by auto-detecting base memory 18, sequentially retrieving BIOS code from the PROM 68, and copying it into a portion of base memory 18 prior to the running of the CPU 10, random accesses of the PROM 68 are eliminated.

Although a single serial-access PROM 68 is preferable in the present invention to minimize pin count, it may be desirable in some situations to cascade a plurality of serial PROMs for additional memory if the pin count is still lower than the pin count of parallel-access PROM.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. An auto-configuring memory controller, coupled to a processor of a computer system, said controller further coupled to a serial-access programmable read-only-memory, comprising:

a serial PROM interface coupling a memory controller and a serial PROM allowing communication between said memory controller and said serial PROM;

a serial PROM interface control logic for controlling said serial PROM interface; and auto-configuring/base memory logic for auto-detecting the base memory in said computer system, and then auto-configuring said memory controller to copy the contents of said serial PROM into said base memory.

2. The memory controller of claim 1, wherein said serial-access PROM uses a page-read mode.

3. The memory controller of claim 1, wherein said serial PROM interface uses a serial protocol.

4. The memory controller of claim 1, wherein said serial PROM interface is a write-protect function.

5. The memory controller of claim 1, wherein said serial PROM interface includes:

a set of pins for inputting and outputting clck signals, inputting and outputting data signals, and inputting write-protect signals.

6. The memory controller of claim 1, wherein said PROM interface control logic comprises:

logic for generating clock signals;

logic for controlling data signals; and logic for generating write-protect signals.

7. A method of loading BIOS code during power-up of a computer system from a serial-access programmable read-only-memory (PROM) using a memory controller, said memory controller having wait state logic and PROM mapping logic, comprising the steps of:

fetching a portion of BIOS code from the PROM by the memory controller prior to a read request by the processor;

buffering said portion of BIOS code;

asserting wait states into processor cycles by said memory controller if said memory controller cannot immediately process a read request by said processor;

read requesting a portion of BIOS code with a processor address from said memory controller by said processor;

mapping said processor address to a corresponding PROM address by said memory controller;

addressing of said PROM with said PROM address;

randomly accessing BIOS code at said PROM address;

serially loading said BIOS code at said PROM address from said PROM to said memory controller;

retrieving BIOS code from a mass storage device of the computer system if a portion of said BIOS code is in said mass storage device; and sending said portion of BIOS code to the processor by said memory controller.

8. A method of loading BIOS code during power-up of a computer system from a serial-access programmable read-only-memory (PROM) using an auto-configuring memory controller, said controller having auto-configuring/base memory logic, comprising the steps of:

halting the running of the processor by the memory controller;

detecting the base memory of the computer system by said memory controller;

auto-configuring said memory controller to allow said memory controller to copy the BIOS content of the serial-access PROM into a portion of said base memory;

sending a load command to said PROM by said memory controller;

serially and sequentially loading the BIOS code from said PROM to said memory controller in response to said load command;

releasing said processor by said memory controller allowing said processor to boot-up; and retrieving a portion of said BIOS code from a mass storage device of the computer system if a portion of said BIOS code is located in said mass storage device.

9. The method of claim 8, wherein the step of serially and sequentially loading the BIOS code from said PROM to said memory controller in response to said load command further includes the step of placing said PROM in a page-read mode for said loading.

10. A computer system comprising:

a processor;

a serial-access programmable read-only-memory (PROM) for storing a portion of BIOS code;

a mass storage device coupled to said processor for storing a portion of BIOS code; and a memory controller coupled to said processor and serially coupled to said PROM for addressing said PROM, for loading a portion of BIOS code from said PROM, and loading a portion of BIOS code from said mass storage device.

11. The computer system of claim 10, said system having firmware stored in said serial-access PROM, wherein said firmware retrieves a portion of BIOS code in said mass storage device.

12. The computer system of claim 10, wherein said mass storage device is a disk drive array.

* * * * *